US006806212B2

(12) United States Patent
Fyfe

(10) Patent No.: US 6,806,212 B2
(45) Date of Patent: Oct. 19, 2004

(54) COATING AND METHOD FOR STRENGTHENING A STRUCTURE

(75) Inventor: Edward R. Fyfe, Del Mar, CA (US)

(73) Assignee: Fyfe Co., LLC

(*) Notice: Subject to any disclaimer, the term of this patent is extended or adjusted under 35 U.S.C. 154(b) by 9 days.

(21) Appl. No.: 10/072,677

(22) Filed: Feb. 7, 2002

(65) Prior Publication Data

US 2003/0148681 A1 Aug. 7, 2003

(51) Int. Cl.[7] .................... B32B 27/12; B32B 27/04
(52) U.S. Cl. .................. 442/104; 442/65; 442/134; 442/136; 442/164; 442/168; 442/169; 442/172; 442/179; 442/180; 52/309.1; 52/454
(58) Field of Search .................. 442/65, 104, 134, 442/164, 169, 168, 172, 179, 180, 136; 52/454, 309.1

(56) References Cited

U.S. PATENT DOCUMENTS

| 5,488,912 A | * | 2/1996 | Pileggi et al. ............ 105/422 |
| 5,649,398 A | | 7/1997 | Isley, Jr. et al. ............ 52/309 |
| 5,657,595 A | | 8/1997 | Fyfe et al. ............ 52/252 |

* cited by examiner

*Primary Examiner*—Ula C. Ruddock
(74) *Attorney, Agent, or Firm*—Mary Jo Redman; Calif Tervo

(57) ABSTRACT

Composite coating (10) improves the resistance to blast or seismic forces of a structure (100), such as wall (101). Coating (10) includes a first layer (20) of elastomeric polyurethane in contact with and adhering to wall (101), a second layer (30) of elastomeric polyurethane in contact with and adhering to first layer (20), and a layer of textile (40) embedded between first layer (20) and second layer (30).

8 Claims, 1 Drawing Sheet

COATING AND METHOD FOR STRENGTHENING A STRUCTURE

FIELD OF THE INVENTION

This invention relates in general to strengthening a structure, and more specifically to a composite coating that can be applied to an existing structure in the field to increase its strength and resistance to explosive, seismic, or other forces.

BACKGROUND OF THE INVENTION

Structures that must bear great weight, such as pillars, walls, or bridge spans, are often constructed from concrete. Concrete is very strong under compression, so can support its own weight as well as the weight of other structural elements, people, vehicles, and equipment.

Concrete is not strong under tension, though, and is a brittle material. Iron reinforcing rods are often embedded in concrete to increase the overall tensile strength. Even reinforced concrete needs to be very thick to withstand the forces generated by a moderate or large explosion, such as can happen in a refinery, cereal mill, power plant, or chemical plant.

Explosion forces often radiate in all directions and may change directions during the course of the blast. Thus, the forces from an explosion are not necessarily along vectors where typical load forces were expected.

Earthquakes, too, can generate large lateral forces that change direction. Many existing structures are not strong enough to withstand a large earthquake and need to be strengthened to meet current standards of safety.

Other structures that may need to withstand extreme, violent forces are the piping and tanks for holding and transporting petroleum products and other potentially explosive chemicals. Because large weights are not supported, tanks and pipes are generally not made of concrete. They are more typically made of a metal, chosen to be unreactive with the contents, nonporous, and much more ductile than concrete, such as iron, steel, or copper. The ductility of metals makes them easy to form into complex shapes, but metals, unless very thick, are generally not greatly resistant to moderate explosions. Most metals are not nearly as brittle as concrete; however, they stretch under force and eventually rupture. Extreme heat, such as can be generated by an explosion or a resulting fire, weakens most metals.

Some structures, such as water storage tanks or airplane bulkheads, were not expected to require high strength when they were designed, but are later found to need strengthening, such as to harden them against deliberate attack with explosives.

Some technology exists for strengthening structures already built, such as wrapping bridge pillars with epoxy-impregnated fiberglass panels to make them less likely to collapse in an earthquake. Some large structures can have additional concrete sprayed onto their surfaces.

Another way of rendering a building more explosion-resistant is to pile sandbags against the walls or on the roof to absorb and diffuse the forces. This is used in wartime or when an explosion is expected, as at a bomb-testing site, but is impractical for routine use and does not lend itself to all structures.

In a laboratory that uses potentially explosive chemicals, barriers of thick polycarbonate or similar material are often erected around reaction vessels. Another strategy used in laboratories and chemical plants is to include an easily knocked-down wall or roof in the design of the building. Shields and blast walls protect the personnel outside them from blasts, but do nothing to confine the explosion reactants and products to their vessel. Fire, secondary explosions, and widespread chemical contamination are common after a chemical explosion in a lab or plant and often cause more property damage and casualties than the blast itself does.

There is an increasing need for a way to strengthen structures against explosion, seismic, and other forces other than by making them extremely thick and massive. Such a means should help the structure keep its integrity, at least long enough for persons to evacuate or for hazardous materials to be removed. Preferably, such a means is applicable to complex structures and to those already built and in use.

SUMMARY OF THE INVENTION

The present invention is a composite coating that may be applied to many structures, such as buildings, bridges, storage tanks, airplane bulkheads, walls, columns, beams, and piping to increase their resistance to explosive, seismic, and other forces.

The composite consists of two layers of rubbery polymer, or elastomer, with a layer of textile embedded between the layers of elastomer. One preferred elastomer is polyurethane, which may be sprayed on as a blend of two precursor components. A mixing gun mixes the two components in the correct ratio so that the components mix in flight and begin to cure into rubbery polyurethane immediately.

A layer of mixed precursor is applied to the structure and a piece of textile is pressed onto the still tacky surface. The viscous fluid holds the textile in place. Another layer of mixed precursor is sprayed over the textile, covering it and bonding to the initial coat of polyurethane through the openings between the yarns. Each layer of cured polyurethane is in the range of 0.03 to 0.25 inch thick, with a maximum preferred total thickness of 0.5 inch. Interior corners are preferably radiused; a coving pre-cast from the same or compatible elastomer as the first and second layers may be glued into the corner to radius it before the first layer is sprayed.

The textile used is typically cloth woven of fiberglass, graphite fiber, or polyaramid (Kevlar). The textile may also be knit. The openings between yarns are in the range of 0.06 inch to 1.0 inch across. Fiber type and weave density are chosen to achieve the desired combination of elongation, stiffness, tensile strength, and cost. The weave orientation may be straight, 45° bias, or another variation.

Multiple layers of textile may be used for some applications. An additional layer of polyurethane is applied before each layer of textile, preferably keeping the total coating thickness less than 0.5 inch.

Because the loosely-woven textile is very flexible and the elastomer is typically sprayed on, this composite coating can be used on complex shapes. The coating is thin and lightweight, making it practical even for airplane bulkheads and similar applications.

Many polymers, including polyurethane and epoxy, decompose into toxic gases when burned, so a fire-resistant paint is preferably applied as the top surface of the composite coating. In some applications, it is preferable to use an elastomer/textile combination that is inherently fire resistant, such as silicone/fiberglass.

The composite, formed-in-place coating of the present invention may be installed more quickly than wrapping with pre-impregnated panels. Quick installation lowers labor cost and is an advantage when reinforcing structures that are inhabited or in use.

The finished coating is relatively light-weight and thin, making it especially applicable to airplane bulkheads and piping. The coating of the present invention can be used where there is not enough clearance for sandbags, shields, sprayed-on concrete, or similar brute force protection.

The invention will now be described in more particular detail. Many modifications and variations of the present invention are possible; it is to be understood that within the scope of the appended claims the invention may be practiced otherwise than as specifically described.

DETAILED DESCRIPTION OF THE INVENTION

Figure 1:
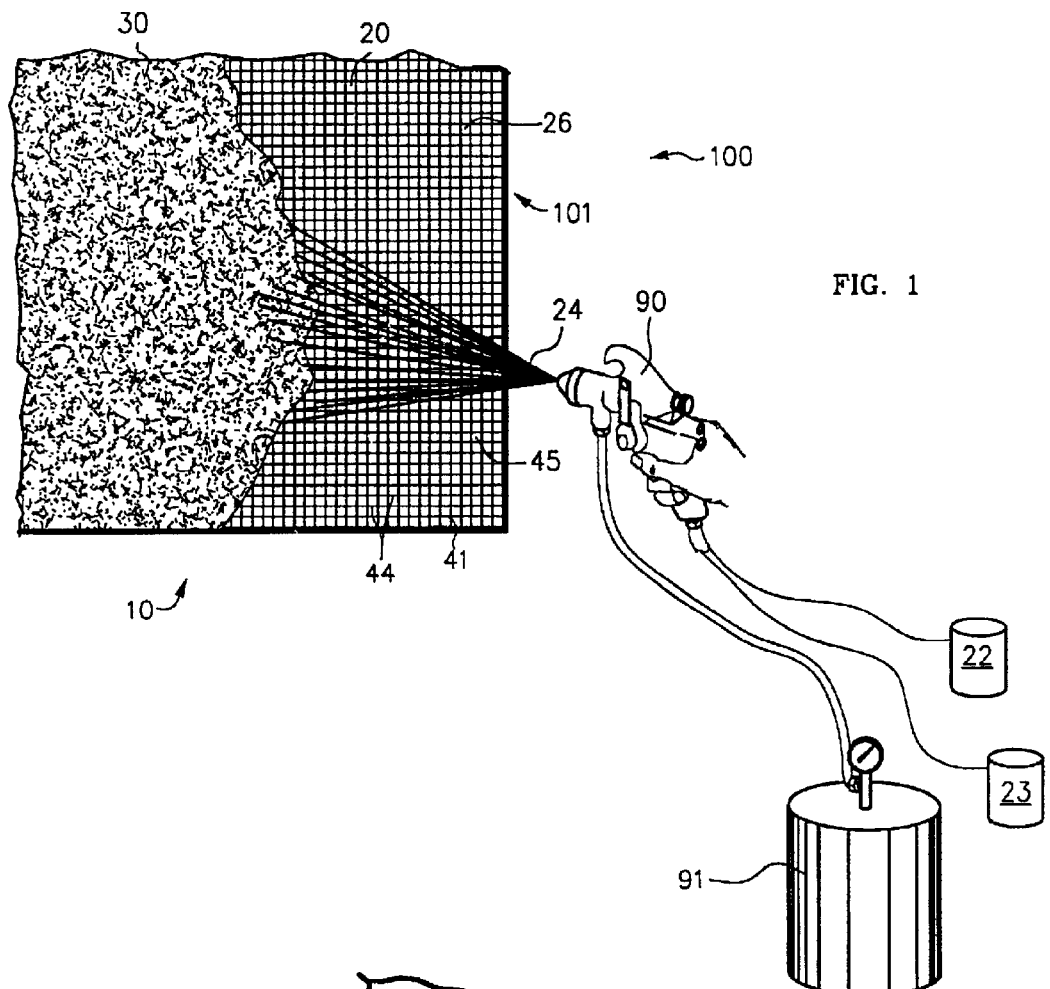
FIG. 1 is an environmental view of the composite coating being applied to a wall.

The present invention is a composite coating 10 and method of application of coating 10 for reinforcing structures 100 such as buildings, bridges, storage tanks, piping, walls 101, floors 103, columns, and airplane bulkheads to increase their resistance to unusual forces. The potential forces may be those anticipated from explosion of hazardous materials such as petroleum products, steam, munitions, or reactive chemicals, may result from sabotage or terrorist attack, or may be due to an earthquake. FIG. 1 is an environmental view of coating 10 being applied to a wall 101.

Coating 10 includes two layers of rubbery polymer, or elastomer, such as polyurethane 27, with a layer of loosely woven or knit textile 40 embedded between the layers of polyurethane 27. The combination of polyurethane 27 and strong but very flexible textile 40 gives composite coating 10 high elongation and tensile strength. Composite coating 10, applied to a structure, increases the apparent ductility and elongation of the structure.

The elastomer is applied in the form of a fluid precursor that crosslinks (cures) under ambient conditions to form a solid rubbery layer that adheres strongly to most building materials, including concrete, wood, and metal. Epoxy, silicone, urethane, polyurea, neoprene, butyl rubber, and natural rubber (latex) are examples of materials that can be formulated to be rubbery when cured and that adhere to many other materials. Other elastomers can be used for this invention, also. If the structure to be strengthened is of an unusual material not spontaneously wetted by common elastomers, an adhesion-promoting primer may be preapplied.

The selected elastomer is preferably one that cures without addition of heat and without evolving solvent vapors, so that it can be applied in the field, such as outdoors or in an inhabited room. Generally, elastomers that cure within these limitations are two-component systems, that is, crosslinking results from reaction between two different chemical components. Both components may end up as part of the elastomer, or one component may act as a catalyst to enable the other component to react within itself to form crosslinks, which solidify the fluid into a solid.

RTV silicone cures upon absorption of water vapor from the air, but this reaction is generally slower than is preferable for the present invention. A thermoplastic elastomer may be applied warm and allowed to "cure" simply by cooling. An emulsion or solution of an elastomer that "cures" by evaporation of the solvent may be used, but the advantage of being able to install the reinforcing coating rapidly in an inhabited area would be largely lost.

One preferred elastomer is polyurethane 27, preferably sprayed on as a two-part mix. Mixing gun 90 mixes the two components 22, 23, often called Part A and Part B, in the correct stoichiometric ratio so that Part A 22 and Part B 23 mix in flight and begin to cure into a rubbery solid immediately.

The mixed precursor 24 is fluid for a short time, then becomes a gel as crosslinks start to form. A gel does not run or slump, but is plastically deformed by small forces. After all available crosslinks have formed, polyurethane 27 is cured and considered a solid, although it is rubbery.

In another preferred embodiment, not depicted, Part A 22 and Part B 23 are premixed in a container and the mixture is applied to the surface of the structure by brush or roller. In this embodiment, a formulation is used that gels somewhat slower than a formulation used for spray application.

A preferred sprayable formulation of polyurethane 27 has been found to have typical elongation of 600–700%, Shore D hardness between 35 and 50, and tensile strength of over 4000 psi. This formulation gels in around 5 seconds, is nontacky after about 20 seconds, and achieves full cure after 24 hours. The mixing ratio of Part A 22 and Part B 23 is one to one and no volatile organic solvents are released.

In FIG. 1, first layer 20 is already applied to a structure 100, such as wall 101 of a building, and has crosslinked so as to be gelled polyurethane 26. Textile 40, such as woven cloth 41, is shown already affixed over gelled polyurethane 26 of first layer 20. Woven cloth 41 includes yarns 44 and openings 45.

Mixing gun 90 uses gas, such as compressed air from tank 91, to draw Part A 22 and Part B 23 of a two-part system from their respective containers and mix them in the stoichiometric blend that will result in proper curing. Mixed fluid precursor 24 is sprayed from mixing gun 90 onto wall 101.

Fluid precursor 24 is applied so as to yield a cured polyurethane 27 of 0.03 to 0.25 inch thick, with a preferred total thickness of about 0.5 inch. First and second layers 20, 30 are preferably thick enough to fully embed cloth 41. It is essential that first layer 20 not be thicker than 0.25 inch thick, so that the properties of first layer 20 and cloth 41 combine. In other words, in the event of an explosion, wall 101 should interact with coating 10 as a composite, not with elastomer first and cloth 41 soon afterward.

Polymers typically shrink as they cure, so applied fluid precursor 24 should be slightly thicker than the desired cured polyurethane 27. For a formulation of a given viscosity, coating thickness is mainly controlled by the speed of travel of mixing gun 90, so training and practice are required to operate gun 90.

One skilled in the art will realize that surface 102 oof wall 101 must be fairly clean and sound before application of first layer 20. Grease, water, or other deposits on surface 102 will decrease the adhesion of coating 10 to structure 100. Thick dust or a crumbly or peeling texture of surface 102 will decrease the overall cohesive strength of reinforced structure 100.

It is generally not necessary to apply a porosity-reducing primer before application of first layer 20, nor is vacuum treatment of applied first layer 20 required.

After a first layer 20 of fluid precursor 24 is applied to structure 100, a piece of textile 40 is pressed against gelled coating 26. Gelled coating 26 is tacky enough that simply placing textile 40 against it causes textile 40 to adhere.

Textile 40, such as woven cloth 41 or a knit fabric, is woven or knit from yarns 44 of a fibrous material such as fiberglass, carbon, or polyaramid. Other types of fiber, including nylon; polyester; natural fibers such as cotton, wool, linen, or silk; or synthetic forms of natural fibers, such as synthetic spider silk; may also be used. More than one type of fiber may be combined within yarns 44 or cloth 41. To improve the adhesion of cloth 41 to elastomer 27, it is preferred that cloth 41 be treated with a coupling agent, such as a nearly monomolecular layer of a polysiloxane.

The openings 45 between yarns 44 are in the range of 0.06 inch to 1.0 inch across. Fiber type and weave density are chosen to achieve the desired combination of elongation, stiffness, tensile strength, and cost. The orientation of yarns 44 also affects the properties of woven cloth 41. Yarns 44 may intersect each other at angles of 90°, 45°, or other angles. For example, cloth 41 may be woven with vertical yarns 44 of nylon fiber, horizontal yarns 44 of glass fiber, with yarns 44 of cotton passing diagonally through cloth 41. It is advantageous for some applications to design cloth 41 so that certain of yarns 44 break predictably sooner than other yarns 44.

The piece of cloth 41 may be precut before application of fluid precursor 24, so that cloth 41 may be affixed without delay. Thus, anchors or fasteners are not needed on flat surfaces.

Although this invention is described and illustrated as a single piece of cloth 41 embedded between first and second layers 20, 30, additional layers of elastomer and cloth may be installed using the same technique as described above.

Figure 2:
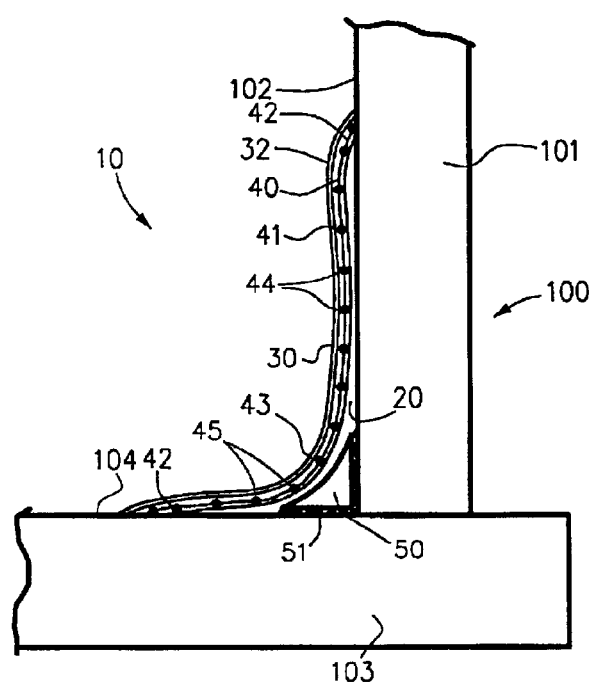
FIG. 2 is a cross-sectional view of the composite coating applied to an interior corner in a structure.

FIG. 2 is a cross-sectional view of coating 10 installed in an interior corner of a building where wall 101 meets floor 103. First layer 20 was applied to surface 102 of wall 101 and to surface 104 of floor 103. In this case, "interior" does not mean the corner must be inside a building, but rather that floor 103 meets wall 101 at a dihedral angle of less than 180°.

Edge portion 42 of a piece of cloth 41 is defined here as the outermost eight inches from the periphery of cloth 41; the central portion 43 being the remainder of cloth 41, within edge portion 42. For maximum strength of the reinforced building, layout of cloth 41 should be planned so that interior corners, such as where wall 101 and floor 103 meet, are covered by central portion 43. Cloth 41 preferably curves concavely over the corner. Opposite edge portions 42 are affixed to opposite members of the corner.

In the case of exterior corners, that is, corners where two walls, a wall and ceiling, a wall and a floor, or other members meet with a dihedral angle of greater than 180°, the corner is preferably covered by central portion 43 but a radius is not preferred. A joint without an angle, such as a seam where two precast portions of wall are butted together, is also preferably covered by central portion 43.

In the case of the interior corner of wall 101 and floor 103 depicted in FIG. 2, the radius of the curve described by cloth 41 is preferably 0.4 inch or greater and is typically about 2 inches. For an interior corner in a small structure 100, such as a blast resistant seat for a person, cloth 41 would curve with a typical radius of 0.125 to 0.4 inch.

It is preferred that the edge portions 42 of pieces of cloth 41 affixed adjacent each other should overlap by about 6 to 12 inches instead of being butted against each other.

It is preferred, but not essential, that anchors, such as disclosed in U.S. Pat. No. 5,649,398, be used to strengthen the attachment of edge portions 42 on opposite sides of the corner in applications where especially high strength is desired.

To aid the persons installing coating 10 achieve the correct radius in an interior corner, coving 50 is pre-cast, preferably from the same polyurethane 27 as is being used for coating 10. Coving 50 is installed in the corner and may be glued into place with any appropriate adhesive 51 known to the trade, to fill in the vertex segment of the dihedral angle, and define a radius. First layer 20 is sprayed over coving 50. Coving 50 also prevents a void from forming between cloth 41 and first layer 20.

Casting coving 50 from the same polyurethane 27 as first layer 20 is preferred for good adhesion between coving 50 and first layer 20. Materials with different thermal expansion properties tend to separate from each other when exposed to thermal cycles, including diurnal or seasonal variation.

Also, it is generally preferred that first layer 20 and second layer 30 be of the same polyurethane 27. That way, first layer 20 and second layer 30 will share the same hardness, chemical nature, and thermal expansion characteristics. Different elastomers can be used for first layer 20 and second layer 30 if the two elastomers are sufficiently compatible.

Most of the above-cited examples of preferred elastomers and textiles are flammable and some evolve toxic fumes when burned. A composite of silicone elastomer and glass fiber is inherently fire-resistant, and polyimide fiber can withstand fairly high temperatures without decomposing. For most composites, though, including the most-preferred polyurethane/glass combination, a means for increasing the fire-resistance of coating 10 is included in second layer 30. Fire-resistant paint 32 can be applied over second layer 30, or second layer 30 may include an admixture of intumescent powder, or both. Similarly, second layer 30 may include reflective or filtering components to increase the resistance of the composite to ultraviolet light or an ultraviolet resistant paint can be applied over second layer 30.

The invention has been shown and described with reference to certain specific embodiments, however, it is to be understood that modifications and substitutions can be made by a person skilled in the art without departing from the spirit and scope thereof.

I claim:

1. In combination: a structure that includes a wall having a surface; and a composite coating adhering to said surface of said wall for increasing the resistance to explosion forces of said structure; comprising:

a first layer comprising an elastomer in intimate contact with and adhering permanently to said surface of said wall;

a second layer comprising an elastomer in intimate contact with and adhering permanently to said first layer; and textile embedded between said first and second layers, wherein said elastomer is the product of a fluid precursor that cures in ambient conditions to form said elastomer, and wherein said composite coating functions to increase the apparent ductility and elongation of the wall when sudden lateral or explosive force is applied to the structure, wherein said fluid precursor is a two-component formulation the reacts upon mixing to become an elastomer.

2. The combination of claim 1, wherein said fluid precursor is a two-component formulation that reacts upon mixing to become polyurethane elastomer.

3. The combination of claim 2, wherein said two-component formulation is applied to said surface by spraying.

4. The combination of claim 1, said textile comprising a fabric including yarns of glass, carbon, polyaramid, or polyimide.

5. The combination of claim 4, wherein said yarns are woven with adjacent parallel yarns spaced apart one-sixteenth of an inch to one inch so as to create openings in said textile penetrable by said fluid precursor.

6. The combination of claim 1, said second layer further including means for rendering said coating fire-resistant.

7. The combination of claim 1 wherein: said composite coating covers substantially the entire said surface of said wall.

8. The combination of claim 1 wherein: said composite coating covers a portion of each of two said walls and an interior angle connecting said two walls, and further including:
 a coving installed in the vertex of the interior angle, for supporting said composite coating in forming a curve having a radius of 0.4 inch or greater.

* * * * *